Nov. 17, 1953

E. B. McMILLAN ET AL  
DIELECTRIC WALL FOR TRANSMISSION  
OF CENTIMETRIC RADIATION 2,659,884

Filed Aug. 3, 1949

INVENTORS.  
EDWARD B. McMILLAN  
HERBERT LEADERMAN  
RAYMOND M. REDHEFFER

BY Benjamin C. Pollard

ATTORNEY

Nov. 17, 1953  E. B. McMILLAN ET AL  2,659,884
DIELECTRIC WALL FOR TRANSMISSION
OF CENTIMETRIC RADIATION

Filed Aug. 3, 1949  2 Sheets—Sheet 2

INVENTORS.
EDWARD B. McMILLAN
HERBERT LEADERMAN
RAYMOND M. REDHEFFER
BY Benjamin C. Pollan
ATTORNEY Patented Nov. 17, 1953

2,659,884

UNITED STATES PATENT OFFICE 2,659,884

DIELECTRIC WALL FOR TRANSMISSION OF CENTIMETRIC RADIATION

Edward B. McMillan, Marblehead, Mass., Herbert Leaderman, Arlington, Va., and Raymond M. Redheffer, Boston, Mass.; said Leaderman and said Redheffer assignors to said McMillan Application August 3, 1949, Serial No. 108,328

8 Claims. (Cl. 343—18)

This invention relates to dielectric walls for transmission of microwave or centimetric electromagnetic radiation and in particular to walls for airborne radomes.

When low loss materials are used, the greatest loss in power transmitted through a radome wall of random dimension is in the power reflected from the surfaces of the wall or walls of the dome. When electromagnetic radiation passes through an interface from material of one dielectric constant (or refractive index) to a material of different dielectric constant, then, in general, part of the energy is transmitted and part is reflected. For example, in the case of a uniform homogeneous sheet partial reflection of the incident radiation occurs where the incident beam strikes the sheet, and when the transmitted beam strikes the rear surface of the sheet, part passes out of the sheet and part is internally reflected. This internally reflected beam returns to the incident face of the sheet. Part of the energy is now transmitted in the opposite direction to the incident ray, and part is again internally reflected, and this process continues. The amplitude of the radiation returning from the sheet into space is consequently the vector sum of the amplitudes of the radiation resulting from reflection at the front face, together with radiation resulting from successive internal reflections. In the case of radome walls constituted of layers of dielectric material of different dielectric constants, the internal reflections are more complicated; however, the same design considerations apply.

Since the thickness of a radome wall is of the order of magnitude of the wavelength of the radiation, it is possible by adjustment of the thickness dimension to reduce to zero the net reflected energy for any particular polarization and angle of incidence for a given wavelength. In a given application the radiation may be incident over a range of angles at both parallel and perpendicular polarization. The problem of design is to secure adequate efficiency of transmission over this range of angles of incidence. In the case of highly streamlined radomes, more particularly radomes which do not protrude from but rather are identical with the fuselage surface of an aircraft, it is not possible to do this with existing radome design.

When angles of incidence are extremely high, as in the streamlined airborne dome, the dimensional accuracy of known radome structures must be so great that cancellation of reflections by controlling the thickness of the radome wall is impossible. Furthermore, while a set of dimensions which would give zero reflection for one angle of incidence can in the case of a type of sandwich wall construction having half-wavelength thick skins give a low reflection at some other angle of incidence, still in no case will it give zero reflection at the second angle. Likewise, while low reflection for a transmission simultaneously over two wavelengths can in the prior art be obtained only with the half-wavelength sandwich, zero reflection can be obtained only at one of the wavelengths.

In the practical case rays from a radar antenna approach the interface at widely varying angles of incidence and, in the case of the new high speed, very streamlined aircraft, at extreme'y high (grazing) angles of incidence. It has heretofore been found impractical to design radomes for very high angles of incidence, or widely varying angles of incidence, or for a broad range of wavelengths. There are special cases where one would like to transmit at widely varying angles of incidence but at the same time have a very minimum of deviation in the direction of the beam. It has been found impractical heretofore to design satisfactory radomes of this type. The homogeneous sheet and the known sandwich constructions, other than the sandwich with half-wave skins, fail to provide transmission with low reflection over a wide range of angles. The half-wave sandwich proves unsatisfactory over such a range, as the dimensional accuracy required for its manufacture is not feasible, and as it produces an objectionable shift in beam direction at high angles of incidence. In addition, it has excessive weight.

It is a feature of the present invention to provide a novel radome structure which gives zero or very low reflection at very high angles of incidence. It is a further feature to provide a radome structure which gives very low reflection over a wide range of angles of incidence, and which does not require extremely high standards of tolerance in manufacture. It is an additional feature to provide a construction with which zero reflection at two or more separated angles of incidence or at two or more different wavelengths can be obtained, low reflection occurring at other intervening angles or wavelengths. It is a still further feature of the present invention to minimize the shift of beam direction at high angles of incidence. It is also a feature to provide a construction in which with zero reflection at one angle of incidence and low reflection at other angles, the core thickness may be made independent of electrical considerations, so that it may be set at a fixed or varying thickness to meet purely structural or other physical requirements. It is an additional feature to provide a construction in which the surface layers give zero reflection at one angle of incidence while the core thickness is adjusted to minimize beam deviation at different angles of incidence.

According to the present invention we provide a dielectric wall construction wherein the dielectric constant increases progressively either in stepwise fashion or continuously and monotonically from the faces to the interior. A simple type of such construction involves a core of selected dielectric constant and a layer or layers of selected lower dielectric constant on each side of the core. The thickness of the layer or layers is such that the path from the interface between the air and the radome surface to the interface between the surface layer and the core represents a round trip distance of the wave in the dielectric material to cause wave interference.

According to the present invention we cancel reflection in both directions of electromagnetic waves by disposing on each side of the core a layer or layers of thickness such that the path from the interface between the air and radome surface and the path from the interface between the surface layer and core represent a round trip distance of substantially one-half wavelength of the beam in the dielectric layer, so as to cause wave interference. At a selected angle of incidence this interference will result in zero reflection for either parallel or perpendicular polarization. At other angles the reflection is small, since the transition from one dielectric medium to another is gradual and a large degree of cancellation still obtains. The thickness of the core may be neglected here.

The wall construction may be made to give zero reflection at an additional wavelength, or to yield zero reflection at another angle, either higher or lower than the first one, by adjusting the thickness of the core as determined by the angle of incidence of the wave into the core and the phase shift of the wave at each of the interfaces. Under certain conditions the thickness approaches that of a half-wavelength of the beam in the dielectric layer. The spacing of the core interfaces causes cancellation by wave interference of reflections otherwise occurring at that wavelength or angle of incidence. Multiples of this spacing may be used.

In that form of the wall construction of the present invention where the dielectric constant increases continuously and monotonically similar considerations apply, and the construction will have low reflection for all wavelengths which are small compared to the total outer layer thickness.

Reference is made to the drawings forming a part of the present disclosure, in which.

Figure 3:
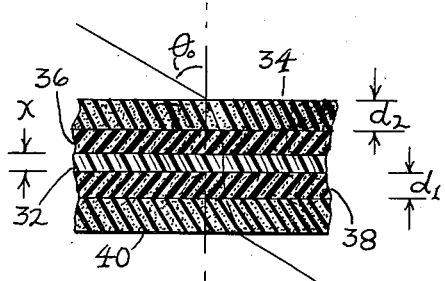
Figure 4:
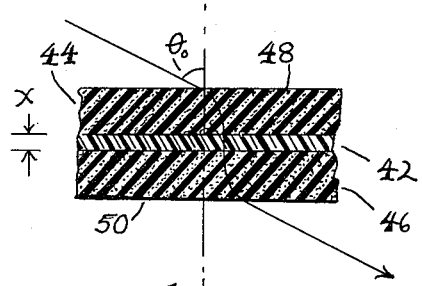
Figure 5:
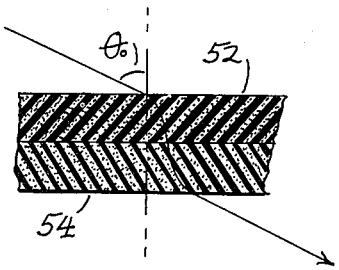
Figure 6:
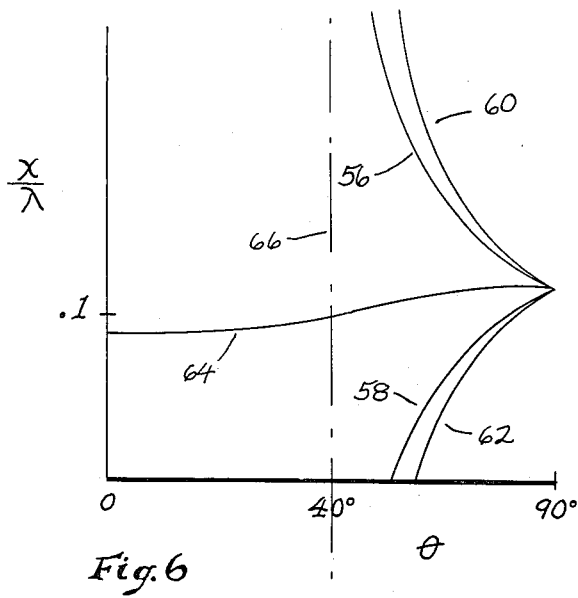

Figure 3 is a diagrammatic cross sectional view of a portion of a further form of radome wall, Figure 4 is a diagrammatic cross sectional view of a portion of a third form of radome wall, Figure 5 is a diagrammatic cross sectional view of a portion of a fifth form of radome wall, according to the present invention, Figure 6 is a graph of power reflection as a function of core thickness and angle of incidence, as used in radome design according to the present invention.

Figure 1:
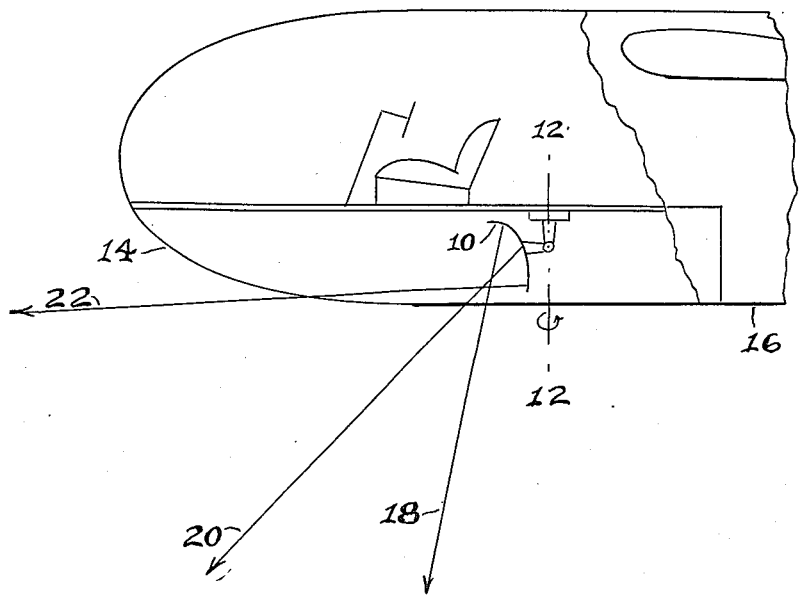
Figure 1 is a diagrammatic sectional view of the forward part of an airplane having radar equipment with a fully retracted antenna and radome.

The radar equipment of the airplane shown in Fig. 1 comprises a reflector 10 mounted for rotation about a vertical axis 12—12 to direct a beam toward the horizon, and a radome 14, which is a section of the fuselage 16 and conforms to the shape desired for aerodynamic purposes. Rays from the reflector 10 strike the inner surface of this type of radome wall at widely varied angles. Thus, a ray 18 from the upper part of the reflector strikes the radome wall 14 almost vertically at an angle of incidence of about ten degrees, a ray 20 from the center of the reflector strikes the radome wall 14 at an angle which approaches forty-five degrees, and a ray 22 from the lower part of the reflector strikes the radome wall at an angle of eighty-five degrees from the normal.

A three-layer dielectric wall 24 (see Fig. 2) suitable for use as a radome wall in radar installations such as that shown in Fig. 1 comprises a core 26 of a strong, high dielectric constant material and face layers 28 and 30 of material of lower dielectric constant, symmetrically disposed on either side of the core.

The materials used in the core and outer layers are chosen from among those available for radomes, fabric laminates, and foams. The outer layers are of low dielectric constant and usually of density less than that of the solid material, frequently containing a proportion of air or other gas. Cellular hard rubbers and cellular hard resin blended with rubber are used. At the same time, the outermost face must possess a resistance to loads and wear of various kinds. The core material is usually solid and of high dielectric constant and must serve as the principal structural member of the wall. A laminate of acrylic or glass fabric impregnated with a hard polyester resin is suitable.

Once the materials, and hence the dielectric constants, have been selected, the general procedure is to design the outer layers first and the inner ones last.

For good properties at a given angle of incidence and wavelength, the angle having been determined by the radiation pattern of the antenna and the geometry of the disposition of the radome with respect to it, in three layer construction 24 the relationship of the dielectric constants of the outer layers 28 and 30 to the dielectric constant of the core 26 is determined by the equations:

If $p = \sin^2 \theta_0$, then $$(\alpha - p)^2 = (1 - p)(\beta - p) \quad \text{Equation 1}$$

for perpendicular polarization of the incident wave, and $$\frac{\alpha 4(1-p)}{(\alpha - p)^2} = \frac{\beta^2}{\beta - p} \quad \text{Equation 2}$$

for parallel polarization, where $\alpha$ is the dielectric constant of the outer layers 28 and 30, and $\beta$ is the dielectric constant of the core 26, and $\theta_0$ is the angle of incidence of the impinging wave.

The radome wall is usually designed to provide minimum reflection for perpendicular polarization alone, as transmission is usually very good at parallel polarization. This is mostly influenced by the Brewster angle of the core material. By "perpendicular polarization," it is meant that the electric vector of the incident wave is perpendicular to the plane of incidence, i. e., the plane in which both the incident and the reflected rays lie. In parallel polarization the electric vector lies in the plane of incidence.

The thickness of the outer layers 28 and 30 is determined by the equation:

$$d = \frac{(2n+1)\lambda_0}{4\sqrt{\alpha-p}} \quad \text{Equation 3}$$

where $d$ is the thickness of each of the layers, $n$ is zero or a positive integer, and $\lambda_0$ is the wavelength of the radiation in the surrounding medium, usually air. The air to outer layer to core transition, and hence the whole structure, will now have zero reflection at angle of incidence $\theta_0$.

The core thickness may be determined without reference to electrical properties, or it may be adjusted for zero reflection at any other selected wavelength or angle of incidence. In the latter case the best design procedure is to prepare first a set of curves in which are plotted the optimum spacing o fthe core surfaces, Xc, for a number of angles of incidence $\theta$ between zero and ninety degrees. For convenience values of $X/\lambda$ may be used as the vertical coordinate to represent core thickness at any wavelength, while the horizontal coordinate is represented by the angle of incidence $\theta$. The optimum thickness is obtained from the following equation, with $p = \sin^2\theta$:

$$\frac{X_c\sqrt{\beta-p}}{\lambda} = \left\{\frac{n}{2} - \frac{1}{2\pi}\tan^{-1}\left[\frac{2\sqrt{(\alpha-p)(\beta-p)}(\alpha-1)\sin\epsilon}{(\alpha+1-2p)(\beta-\alpha)+(\alpha-1)(\beta+\alpha-2p)\cos\epsilon}\right]\right\} \quad \text{Equation 4}$$

where $$\epsilon = \frac{4\pi d\sqrt{\alpha-p}}{\lambda}$$

(see page 12 of Massachusetts Institute of Technology Radiation Laboratory Report 483-20 of January 4, 1946, Radome Bulletin 20), and the "half-sandwich" amplitude reflection coefficient $r$ for perpendicular polarization as follows:

$$r = \left[\frac{A-B}{A+B}\right]^{\frac{1}{2}} \quad \text{Equation 5}$$

where $A = (\alpha+\beta-2p)(\alpha+1-2p) - (\alpha-\beta)(\alpha-1)\cos\epsilon$
$B = 4(\alpha-p)[(1-p)(\beta-p)]^{1/2}$ Since transmission is usually good at parallel polarization for a radome designed for perpendicular polarization, computation of Xc and $r$ for parallel polarization can usually be neglected. However, to determine them the following equations can be employed:

$$\frac{X_c\sqrt{\beta-p_0}}{\lambda} =$$

$$\frac{n}{2} - \frac{1}{2\pi}\tan^{-1}\left[\frac{2\sqrt{\alpha'\beta'}(\alpha'-1)\sin\epsilon}{(\alpha'+1)(\beta'-\alpha')+(\alpha'-1)(\beta'+\alpha')\cos\epsilon}\right]$$

Equation 6 where $$\alpha' = \frac{\alpha^2(1-p_0)}{\alpha-p_0}$$

and $$\beta' = \frac{\beta^2(1-p_0)}{\beta-p_0}$$

and $$r = \left[\frac{C-D}{C+D}\right]^{\frac{1}{2}} \quad \text{Equation 7}$$

where $C = (\alpha'+\beta')(\alpha'+1) - (\alpha'-\beta')(\alpha'-1)\cos\epsilon$ $D = 4\alpha'\sqrt{\beta'}$ It is next necessary to determine the overall amplitude reflection R of the wall cross section. If $$\phi = (X - Xc)\sqrt{\frac{\beta-p}{\lambda}}$$

where X is a selected core thickness, then R is given by:

$$R = \frac{2|r\sin 2\pi\phi|}{(1 - 2r^2\cos 4\pi\phi + r^4)^{\frac{1}{2}}} \quad \text{Equation 8}$$

A set of curves which will find general usefulness for various types of radome wall computation is prepared, using Equation 8, in which R is plotted versus $\phi$ with $r$ as a parameter. It is possible now to plot the points on the design curve, wherein, for coordinates of $X/\lambda$ and $\theta$, contours of equal power reflection $R^2$ are shown. In our design work we were interested in contours for five percent and for ten percent of reflected power. Fig. 6 is such a chart, for a wall construction of the type shown in Fig. 2, in which the outer layer dielectric constant $\alpha$ is less than the core dielectric constant $\beta$. In this case $\alpha = 1.649$, $\beta = 3.000$, and $d/\lambda_0 = .2237$, computed to give zero reflection at $\theta_0 = 40°$.

Presentation of the results in this form allows determination of the optimum core thickness Xc with due regard to the behaviour over a range of angles, and it makes the effect of deviations from this optimum readily apparent to the eye. In Fig. 6 curves 56 and 58 represent lines of constant power reflection, for which the value is five percent, and curves 60 and 62 represent constant power reflection lines for which the value is ten percent. The space between lines 56 and 58 on the right over to the vertical coordinate axis on the left represents an area of less than five percent power reflection of the incident wave, while along lines 64 and 66 the reflection is zero. The vertical distance between any selected value of core thickness is plotted on this graph and the constant power reflection curves give the dimensional tolerance values for use in controlling the actual construction of a radome.

It was found in the example shown in Fig. 6 that there was infinite dimensional tolerance for the condition $0° < \theta < 57.5°$, in which area the reflected power $R^2 \leq 5\%$, and $0° < \theta < 63°$ in which area the reflected power $R^2 \leq 10\%$. At an angle of incidence $\theta = 85°$ the tolerance within ten percent of reflected power was found to be $\pm.013\lambda$ which yields practical values in the one to ten centimeter wave range.

In Fig. 6 it can be seen that with a core thickness equal to $$\frac{X}{\lambda_0}$$

such that this value is the vertical distance from the horizontal coordinate axis to the point of intersection of line 64 with line 62, a radome so designed and built will have zero reflection at an angle of incidence of 90°, a substantial dimensional tolerance at 85° in the one to ten centimeter range, zero reflection at 40°, and extremely low reflection with infinite tolerance at angles between 63° and zero degrees of incidence. This is a novel condition as compared to the known prior art, yielding most exceptionally good factors for practical radome design.

Employing the curve of Fig. 6, we designed three practical radomes. The first was the nose of an aircraft, employing radar at 1.25 centimeters wavelength. In it, as in the other two, the core was a full density laminate of an acrylic fabric with a polyester-styrene laminating resin, having a dielectric constant of 3.000, and the outer layers were a hard resin-rubber foam of 28.9 lb./cu. ft. density, having a dielectric constant of 1.649 and being compounded from a styrene-diolefin rubber reinforcing resin blended with styrene-butadiene rubber and vulcanizing agents. The thickness of the core was .0765 inch and of the outer layers .1100 inch for each layer, a total of .2965 inch. The second was the chin section of the fuselage of a large fast plane, as in Fig. 1, with radar at 3.2 cm. wavelength. The thickness of the high density core was .195 inch and of the outer layers .282 inch each layer, a total of .759 inch. The third radome was a large, hurricane proof shipboard installation for radar at ten centimeters wavelength. The higher density core was .610 inch thick, and the lower density outer layers were .880 inch thick, a total of 2.37 inches. Their performance was determined by analysis to be exceptionally good.

A multi-layer wall (see Fig. 3) suitable for use as a radome wall in an installation such as that shown in Fig. 1 comprises a core 32 of a strong, high dielectric constant material and a number of laminae 34, 36, 38, and 40, symmetrically disposed on either side of the core 32, in which the laminae progressively farther from the core have progressively lower dielectric constants. That is, laminae 34 and 40 have dielectric constants lower than laminae 36 and 38, respectively, which in turn have lower dielectric constants than the core 32. However, the core may be replaced by a pair of inner layers, separated by a gap of lower dielectric constant.

The multi-layer wall radome is designed as follows. If the dielectric constant of any layer K, including the core X, is $\epsilon_K$, then its relation to the dielectric constants of the surrounding outer medium, such as air, of which the dielectric constant is $a$ in the present case, and to the dielectric constant of the core $\beta$, is given by the following expression for perpendicular polarization of the incident wave:

$$\frac{\epsilon_k - p}{1-p} = \left(\frac{\alpha-p}{1-p}\right)^{1-K/n}\left(\frac{\beta-p}{1-p}\right)^{K/n}$$

Equation 9 where $(K=0, 1, \ldots n)$, and $p$ and $\beta$ have their previously described significance. For parallel polarization:

$$\epsilon_K^2\left(\frac{1-p}{\epsilon_K-p}\right) = \left[\alpha^2\left(\frac{1-p}{\alpha-p}\right)\right]^{1-K/n}\left[\beta^2\left(\frac{1-p}{\beta-p}\right)\right]^{K/n}$$

Equation 10

The thickness $d_K$ of the layer K is determined by:

$$d_K = \frac{\lambda}{4\sqrt{\epsilon_K-p}}$$

Equation 11

Figure 2:
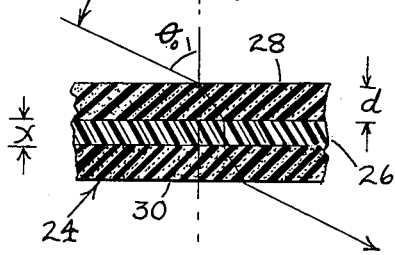
Figure 2 is a diagrammatic cross sectional view of a portion of one form of radome wall according to the present invention.

The core thickness X is determined as for the case of the radome of Fig. 2.

A three-layer wall (see Fig. 4) suitable for use as a radome wall in an installation such as that shown in Fig. 1 comprises a core 42 of a strong, high dielectric constant material and possesses symmetrically disposed laminae 44 and 46, the dielectric constant of which decreases continuously and monotonically from the core 42 toward the outer faces 48 and 50. At the interface with the core 42, the dielectric constant of the laminae 44 and 46 may be less than, equal to, or greater than the dielectric constant of the core 42. Unless it is equal, the core must be designed according to Equation 4, if it is to be non-reflective at some angle. In most cases, however, it will give only very low reflection.

The design procedure for the outer layers is as follows. If a series of sheets satisfies Equations 1, 2, 3, and 4, and if the wavelength is allowed to approach zero with constant overall thickness $l$, then the thickness of the individual sheets must approach zero, the number of sheets increasing indefinitely. The final configuration is one in which the dielectric constant varies continuously from outer surface to core. The limiting dielectric constant $\epsilon(y)$ is determined as follows:

$$\epsilon(y) = \frac{\alpha-p}{\left[\frac{y}{d}\left(\sqrt{\frac{\alpha-p}{\beta-p}}-1\right)+1\right]^2} + p$$

Equation 12 for perpendicular polarization. Here $y$ is the distance from the air to dielectric interface. The dielectric constant $\alpha$ is the value for the air to dielectric interface, $\beta$ is the dielectric constant of the core, and $d$ is the skin thickness. The construction will have low reflection for all wavelengths small compared to the total outer layer thickness, a property which cannot be attained with the radome constructions known to the prior art.

For parallel polarization one uses the equivalent dielectric constants for that case as for Equation 6, and the sums which arise are replaced by integrals. This procedure is valid without error in the limiting case of continuous variation.

A two-layer wall (see Fig. 5) suitable for use as a radome wall in an installation such as that shown in Fig. 1 comprises symmetrically disposed laminae 52 and 54, the dielectric constant of which decreases continuously and monotonically from their joint interface where the dielectric constant is $\beta$ to the outer surface where it is $\alpha$. The wall is designed with these values by the same method as we described for the three-layer wall of Fig. 4.

Having thus described our invention, what we claim and desire to secure by Letters Patent is:

1. A dielectric wall adapted for through passage of electromagnetic waves impinging on the faces thereof, said wall comprising a dielectric sheet wherein the dielectric constant increases from both faces to the interior.

2. A wall adapted for through passage of electromagnetic waves impinging on the faces thereof, said wall comprising a dielectric sheet wherein the dielectric constant increases monotonically from both faces to the interior.

3. A wall adapted for through passage of electromagnetic waves impinging on the faces thereof, said wall comprising an inner dielectric layer and outer dielectric layers disposed on opposite sides of said inner layer, the dielectric constant of said outer layers increasing continuously and monotonically from both surfaces of said wall to the interfaces between said inner layer and the adjacent outer layers.

4. A wall adapted for through passage of electromagnetic waves impinging on the faces thereof, said wall comprising an inner dielectric layer and outer dielectric layers disposed on opposite sides of said inner layer, the dielectric constant of said outer layers increasing continuously and monotonically from both surfaces of said wall to the interfaces between said inner layer and the adjacent outer layers, and said inner layers having a dielectric constant at least equal to the dielectric constants of the adjacent surfaces of the outer layers.

5. A wall for transmission of electromagnetic waves and having reduced reflection for said waves at a given angle of incidence, said wall comprising an inner dielectric layer and outer dielectric layers, the dielectric constant of each outer layer being smaller than the dielectric constants of the adjacent inner layer, said outer layer providing a path from the surface of incidence of said waves to the interface between said layer and the adjacent inner layer and back to said surface of incidence, the thickness of said outer layers providing a length for said path at said angle of incidence whereby to cause interference between incident and reflected waves.

6. A wall for transmission of electromagnetic waves comprising an inner dielectric layer and outer dielectric layers, the dielectric constant of said outer layers being smaller than the dielectric constant of said inner layers, the dielectric constants of the inner layer and outer layers being given by the following equations: if $p=\sin^2\theta_0$, then for perpendicular polarization $$(\alpha - p^2) = (1-p)(\beta - p)$$

and for parallel polarization $$\frac{\alpha^4(1-p)}{(\alpha-p)^2} = \frac{\beta^2}{\beta-p}$$

the thickness of said outer layers for transmission at an angle of incidence being given by the following equation, $$d = \frac{(2n+1)\lambda}{4(\alpha-p)^{1/2}}$$

where $p=\sin^2\theta$, $\alpha$ is the dielectric constant of the outer layers, $\beta$ is the dielectric constant of the inner layers, $\theta_0$ is the angle of incidence, $d$ is the thickness of the outer layers, $n$ is zero or any whole number, and $\lambda_0$ is the wavelength in air of the electromagnetic waves whereby to cause wave interference.

7. A wall for transmission of electromagnetic waves comprising an inner dielectric layer and outer dielectric layers disposed on opposite sides of said inner layer, the dielectric constant of said outer layers being smaller than the dielectric constant of said inner layer, the dielectric constant of said inner layer and the dielectric constant and the thickness of said outer layers providing for transmission at a first angle of incidence, paths from the faces of the outer layers nearer the surfaces of said wall to the interfaces between said outer layers and said inner layer and back to said faces near said surfaces of such length that the reflected waves are out of phase and in opposition with waves reflected from the surface of said layer whereby to cause wave interference to reduce reflections, and the thickness of the inner layer being such as to provide for transmission at a second angle of incidence a path such that the combined reflections from the exterior face of the last outer layer to be traversed by an incident ray, and the interface between the inner layer and outer layer adjacent the side of said inner layer away from the source of radiation will interfere with the combined reflections from the exterior face of the first outer layer to be traversed by an incident ray, and the interface between the inner face of said first outer layer and the inner layer.

8. A wall for transmission of electromagnetic waves comprising an inner dielectric layer and outer layers disposed on opposite sides of said inner layer, the dielectric constant of said outer layers being smaller than the dielectric constant of said inner layer, and the thickness of said outer layers providing for transmission at a first angle of incidence; paths of substantially one-half wavelength from the faces of the outer layers nearer the surfaces of said wall to the interfaces between said outer layers and said inner layer and back to said faces, whereby to cause wave interference to reduce reflection, and the thickness of the inner layer being such as to provide for transmission at a second angle of incidence a path such that the combined reflection from the interface between the inner layer and the outer layer, adjacent to the side of said inner layer away from the source of radiation, will interfere with the combined reflections from the face of the other outer layer toward the source of radiation and the interface between the first mentioned outer layer and the inner layer.

EDWARD B. McMILLAN.
HERBERT LEADERMAN.
RAYMOND M. REDHEFFER.

References Cited in the file of this patent

UNITED STATES PATENTS

| Number | Name | Date |
|---|---|---|
| 2,202,380 | Hollmann | May 28, 1940 |
| 2,405,992 | Bruce | Aug. 20, 1946 |
| 2,433,924 | Riblet | Jan. 6, 1948 |
| 2,501,072 | McMillan | Mar. 21, 1950 |

FOREIGN PATENTS

| Number | Country | Date |
|---|---|---|
| 598,494 | Great Britain | Feb. 19, 1948 |

OTHER REFERENCES

"Radar Scanners and Radomes," by Cady, Karelitz and Turner, volume 26, MIT Radiation Lab. Series, pages 327 and 328, published 1948 by McGraw-Hill Books Company.